US010171952B2

(12) United States Patent
Kumar et al.

(10) Patent No.: US 10,171,952 B2
(45) Date of Patent: Jan. 1, 2019

(54) METHOD FOR MANAGING A LOCATION OF A TERMINAL IN WIRELESS COMMUNICATION SYSTEM

(71) Applicant: Samsung Electronics Co., Ltd., Gyeonggi-do (KR)

(72) Inventors: Lalith Kumar, Bangalore (IN); Naga Rajesh Adda, Bangalore (IN); Pavan Kumar Devarayanigari, Bangalore (IN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/343,845

(22) Filed: Nov. 4, 2016

(65) Prior Publication Data
US 2017/0127244 A1    May 4, 2017

(30) Foreign Application Priority Data

Nov. 4, 2015  (IN) .................... 5970/CHE/2015 PS
Jun. 30, 2016  (IN) .................... 5970/CHE/2015 CS

(51) Int. Cl.
*H04W 4/02* (2018.01)
*H04W 4/04* (2009.01)

(52) U.S. Cl.
CPC .......... *H04W 4/043* (2013.01); *H04W 4/025* (2013.01)

(58) Field of Classification Search
CPC ............................. H04W 4/043; H04W 4/025
USPC .................................. 701/434, 516; 340/7.27
See application file for complete search history.

(56) References Cited

U.S. PATENT DOCUMENTS

| 2010/0075665 | A1 | 3/2010 | Ali et al. | |
| 2014/0045488 | A1* | 2/2014 | Cheng | H04W 24/00 455/423 |
| 2015/0131437 | A1* | 5/2015 | Kim | H04W 28/0289 370/230 |
| 2017/0026870 | A1* | 1/2017 | Miklos | H04W 28/0289 |
| 2017/0325130 | A1* | 11/2017 | Purohit | H04W 36/0022 |

\* cited by examiner

*Primary Examiner* — Inder P Mehra
(74) *Attorney, Agent, or Firm* — The Farrell Law Firm, P.C.

(57) ABSTRACT

A method of a terminal and the terminal are provided. The method includes detecting a location area change when a congestion timer is running and one of a general packet radio service (GPRS) update status indicating "GU1 UPDATED," a mobility management (MM) update status indicating "U1 UPDATED," and an evolved packet system "EPS" update status indicating "EU1 UPDATED" is indicated; adaptively changing the GPRS update status to "GU2 NOT UPDATED," the MM update status to "U2 NOT UPDATED," and the EPS update status to "EU2 NOT UPDATED"; and entering a state of "GMM-REGISTERED.ATTEMPTING-TO-UPDATE," "MM IDLE, ATTEMPTING TO UPDATE," or "EMM-REGISTERED.ATTEMPTING-TO-UPDATE," in accordance with one of "GU2 NOT UPDATED," "U2 NOT UPDATED," and "EU2 NOT UPDATED."

20 Claims, 6 Drawing Sheets

METHOD FOR MANAGING A LOCATION OF A TERMINAL IN WIRELESS COMMUNICATION SYSTEM

PRIORITY

This application claims priority under 35 U.S.C. § 119(a) to an Indian Provisional Patent Application filed on Nov. 4, 2015 in the Indian Intellectual Property Office (IIPO) and assigned Serial No. 5970/CHE/2015 (PS), and to an Indian Complete Patent Application filed on Jun. 30, 2016 in the IIPO and assigned Serial No. 5970/CHE/2015 (CS), the entire disclosure of each of of which is incorporated herein by reference.

BACKGROUND

1. Field of the Disclosure

The present disclosure relates to a method of managing location at terminal in a wireless communication system.

2. Description of the Related Art

In related art methods and systems, a mobile terminal (e.g. a user equipment (UE), mobile station, or the like) is initially in an idle, normal service sub-state. A mobile terminal sends a connection management (CM) service request to a network. In response, the mobile terminal receives a CM service reject message with cause congestion #22 from the network. Then, the mobile terminal starts a timer (e.g., a T3246 timer, a T3346 timer, or the like). Then, the mobile terminal changes an identity (e.g. a location area identity (LAI), a routing area identity (RAI), a tracking area identity (TM), or the like), but the mobile terminal will not initiate any updating procedure (e.g., a location area update (LAU) procedure, a routing area update (RAU) procedure, a tracking area update (TAU) procedure, or the like) if the timer is still running. Further, a sub-state of the mobile terminal may still be in a normal service state, thus when the timer expires, the mobile terminal will not trigger any updating procedure. This leads to the mobile terminal not getting registered with a network. As a consequence, a mobile terminating (MT) call will not be available to a user.

SUMMARY

An aspect of the present disclosure provides a method to manage a location at a terminal for avoiding missing paging in a wireless communication system.

Another aspect of the present disclosure provides a method of adaptively changing a general packet radio service (GPRS) update status to internal mobile station (MS) parameter "GU2 NOT UPDATED," which is a GPRS Mobility Management (GMM) update status parameter that is set when the last attachment procedure or the last the last routing area (RA) update procedure has failed, in response to determining that a congestion timer is running and the GPRS update status indicates internal MS parameter "GU1 UPDATED," which is a GMM update status parameter that is set when the last attachment procedure or the last routing area (RA) update procedure was successful.

Another aspect of the present disclosure provides a method of adaptively changing a mobility management (MM) update status to "U2 NOT UPDATED," which is a 3rd Generation Partnership Project (3GPP) Stage 3 Release 1999 update status parameter that is set when the last location updating attempt that was not successful, in response to determining that a congestion timer is running and the MM update status indicates "U1 UPDATED," which is a 3GPP Stage 3 Release 1999 update status parameter that is set when the last location updating attempt was successful.

Another aspect of the present disclosure provides a method of adaptively changing an evolved packet system (EPS) update status to "EU2 NOT UPDATED," which is a 3GPP Stage 3 Release 8 update status parameter that is set when the last attach, service request, or tracking area updating attempt failed procedurally, in response to determining that a congestion timer is running and the EPS update status indicates "EU1 UPDATED," which is a 3GPP Stage 3 Release 8 update status parameter that is set when the last attach or tracking area updating attempt was successful.

Another aspect of the present disclosure provides a method of entering a state of "GMM-REGISTERED.ATTEMPTING-TO-UPDATE," which is a 3GPP Stage 3 Release 1999 parameter that is set when a routing area updating procedure failed due to a missing response from the network, in accordance with a change in "GU1 UPDATED."

Another aspect of the present disclosure provides a method of entering a state of "MM IDLE, ATTEMPTING TO UPDATE," which is a 3GPP Stage 3 Release 8 update status parameter that is set when valid subscriber data are available, in accordance with a change in "U1 UPDATED."

Another aspect of the present disclosure provides a method of entering state of "EMM-REGISTERED.ATTEMPTING-TO-UPDATE which is a 3GPP Stage 3 Release 8 update status parameter that is set when the tracking area updating attempt failed due to a missing response from the network," in accordance with a change in "EU1 UPDATED."

Another aspect of the present disclosure provides a method of initiating an update procedure to a network in response to determining that a timer is expired.

According to aspect of the present disclosure, a method of a mobile terminal is provided. The method includes detecting a location area change when a congestion timer is running and one of a GPRS update status indicates "GU1 UPDATED," a mobility management (MM) update status indicating "U1 UPDATED," and an evolved packet system (EPS) update status indicating "EU1 UPDATED" is indicated; adaptively changing the GPRS update status to "GU2 NOT UPDATED," the MM update status to "U2 NOT UPDATED," or the EPS update status to "EU2 NOT UPDATED"; and entering a state of "GMM-REGISTERED.ATTEMPTING-TO-UPDATE," "MM IDLE, ATTEMPTING TO UPDATE," or "EMM-REGISTERED.ATTEMPTING-TO-UPDATE," in accordance with one of "GU2 NOT UPDATED," "U2 NOT UPDATED," and "EU2 NOT UPDATED."

Another aspect of the present disclosure provides an entered state may be "GMM-REGISTERED.ATTEMPTING-TO-UPDATE" if a change in a GPRS update status indicates "GU2 NOT UPDATED," where a congestion timer is a T3346 timer and the GPRS update status is "GU1 UPDATED" and a change in location area corresponds to a change in a RAI.

Another aspect of the present disclosure provides an entered state may be "MM IDLE, ATTEMPTING TO UPDATE" if a change in an MM update status indicates "U2 NOT UPDATED," where a congestion timer is a T3246 timer and the MM update status is "U1 UPDATED" and a change in location area corresponds to a change in an LAI.

Another aspect of the present disclosure provides an entered state may be "EMM-REGISTERED.ATTEMPTING-TO-UPDATE" if a change in an EPS update status indicates "EU2 NOT UPDATED," where a congestion timer is a T3346 timer and an EPS update status is "EU1 UPDATED" and a change in location area corresponds to a change in a TAI.

Another aspect of the present disclosure provides a method of determining that a congestion timer is expired is provided. Further, a method of initiating an update procedure to a network is provided, where the update procedure corresponds to one of an LAU procedure, an RAU procedure, and a TAU procedure.

According to another aspect of the present disclosure, a mobile terminal is provided. The mobile terminal includes a location area change device configured to detect a location area change, if a congestion timer is running and a GPRS update status indicating "GU1 UPDATED," an MM update status indicating "U1 UPDATED," and an EPS update status indicating "EU1 UPDATED" is indicated; a status change device configured to adaptively change the GPRS update status to "GU2 NOT UPDATED," the MM update status to "U2 NOT UPDATED," and the EPS update status to "EU2 NOT UPDATED"; and a state entering device configured to enter a state of "GMM-REGISTERED.ATTEMPTING-TO-UPDATE," "MM IDLE, ATTEMPTING TO UPDATE," or "EMM-REGISTERED.ATTEMPTING-TO-UPDATE" in accordance with one of "GU2 NOT UPDATED," "U2 NOT UPDATED," and "EU2 NOT UPDATED."

BRIEF DESCRIPTION OF THE DRAWINGS

The above and other aspects, features, and advantages of the present disclosure will be more apparent from the following description, taken in conjunction with the accompanying drawings, in which.

DETAILED DESCRIPTION OF OF EMBODIMENTS OF THE PRESENT DISCLOSURE

Figure 1:
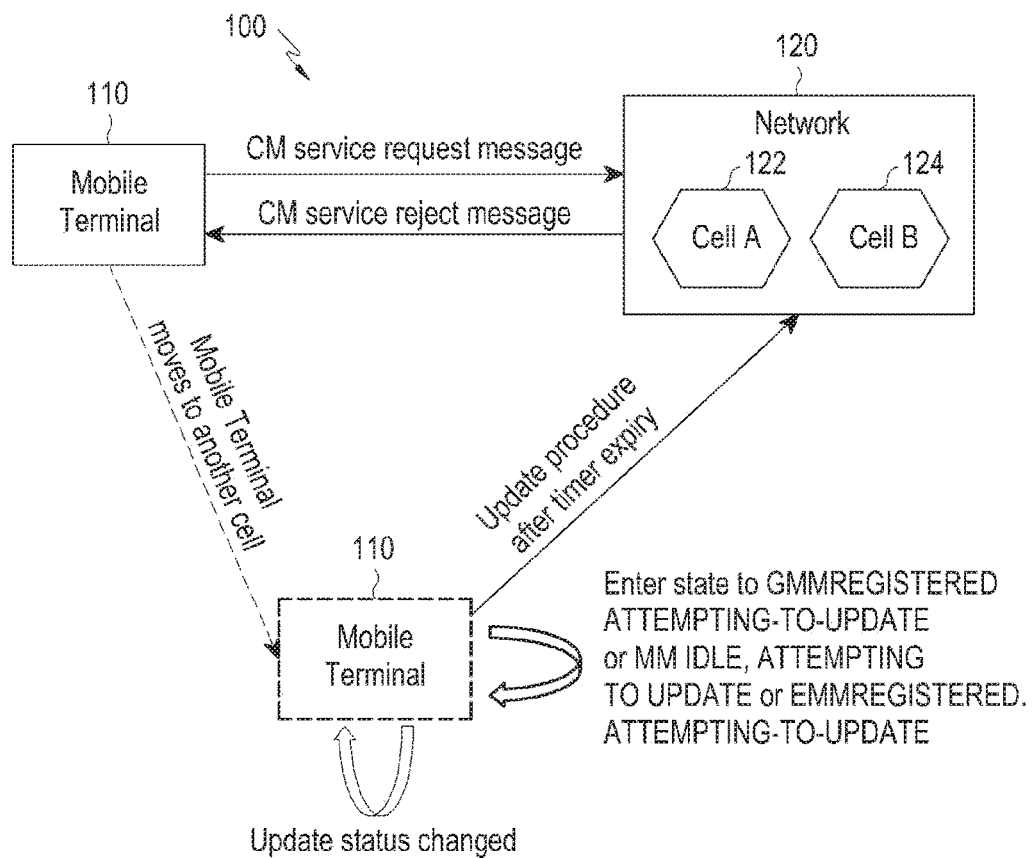
FIG. 1 is a block diagram of a system of avoiding missing paging, according to an embodiment of the present disclosure.

The embodiments of the present disclosure herein and the various features and advantageous details thereof are more fully described below with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments may be combined with one or more other embodiments to form new embodiments. The term "or" as used herein, refers to a non-exclusive or, unless otherwise indicated. The examples described herein are intended merely to facilitate an understanding of ways in which the embodiments described herein may be practiced and to further enable those skilled in the art to practice the embodiments described herein. Accordingly, the examples are not intended to be construed as limiting the scope of the present disclosure as defined by the appended claims and their equivalents. Throughout the accompanying drawings, like reference letters indicate corresponding parts.

The embodiments of the present disclosure described herein achieve a method for managing a location at a terminal, the method comprising: transmitting a service request message to a network comprising at least one cell; if a service reject message is received from the network, in response to the service request message, starting a congestion timer; detecting a location area change when a congestion timer is running and one of status parameters related to a location update of the terminal set a first value indicating that a procedure of the location update was successful; setting the value of the status parameter as a second value indicating the procedure of the location update was failed; and transitioning a state of the terminal to a state indicating the procedure of the location update was failed.

The embodiments of the present disclosure described herein achieve a terminal for managing a location at a terminal, the terminal comprising: a transceiver configured to transmit a service request message to a network comprising at least one cell; if a service reject message is received from the network, in response to the service request message, a controller configured to start a congestion timer, detect a location area change when a congestion timer is running and one of status parameters related to a location update of the terminal set a first value indicating that a procedure of the location update was successful, set the value of the status parameter as a second value indicating the procedure of the location update was failed, and transit a state of the terminal to a state indicating the procedure of the location update was failed.

The embodiments of the present disclosure described herein achieve a method implemented in a mobile terminal. The method includes detecting a location area change when a congestion timer is running and one of a GPRS update status indicates "GU1 UPDATED," an MM update status indicates "U1 UPDATED," and an EPS update status indicates "EU1 UPDATED." Further, the method includes adaptively changing one of the GPRS update status to "GU2 NOT UPDATED," the MM update status to "U2 NOT UPDATED," and the EPS update status to "EU2 NOT UPDATED." Furthermore, the method includes entering a state of one of "GMM-REGISTERED.ATTEMPTING-TO-UPDATE," "MM IDLE," "ATTEMPTING TO UPDATE," and "EMM-REGISTERED.ATTEMPTING-TO-UPDATE," in accordance with one of "GU2 NOT UPDATED," "U2 NOT UPDATED," and "EU2 NOT UPDATED."

Unlike conventional systems and methods, the method may be used to handle a UE's state machine, while the UE is running a back-off timer. The method avoids missing paging when the network recovers from congestion.

FIG. 1 is a block diagram of a system 100 of avoiding missing paging, according to an embodiment of the present disclosure.

Referring to FIG. 1, illustrates generally, among other things, a high level overview of a system 100 to avoid missing of paging, according to embodiments as disclosed herein. The system 100 includes a mobile terminal 110 and a network 120, where the network 120 has a cell A 122 and a cell B 124.

The mobile terminal 110 may be, for example but not limited to, a cellular phone, a tablet computer, a smart phone, a laptop computer, a personal digital assistant (PDA), a global positioning system, a multimedia device, or the like.

The mobile terminal 110 may also be referred to those skilled in the art as a mobile station, a subscriber station, a UE, a mobile unit, a subscriber unit, a wireless unit, a remote unit, a mobile device, a wireless device, a wireless communications device, a mobile subscriber station, an access terminal, a wireless terminal, a remote terminal, a handset, a user agent, a mobile client, or the like.

The mobile terminal 110 is configured to detect a location area change. Further, the mobile terminal 110 determines whether a congestion timer is running and one of a GPRS update status indicates "GU1 UPDATED," an MM update status indicates "U1 UPDATED," and an EPS update status indicates "EU1 UPDATED." The mobile terminal 110 is configured to adaptively change one of the GPRS update status to "GU2 NOT UPDATED," the MM update status to "U2 NOT UPDATED," and the EPS update status to "EU2 NOT UPDATED." The mobile terminal 110 is further configured to enter a state of one of "GMM-REGISTERED.ATTEMPTING-TO-UPDATE," "MM IDLE, ATTEMPTING TO UPDATE," and "EMM-REGISTERED.ATTEMPTING-TO-UPDATE," in accordance with one of "GU2 NOT UPDATED," "U2 NOT UPDATED," and "EU2 NOT UPDATED."

"GU1: UPDATED" indicates that a last GPRS attach or RAU attempt was successful (e.g., correct procedure outcome, and an answer was accepted by a system), a subscriber identity module (SIM)/universal SIM (USIM) contains an RAI of a routing area (RA) to which a subscriber was attached, and possibly a valid packet-temporary mobile subscriber identity (P-TMSI), GPRS global system for mobile communication (GSM) ciphering key, GPRS universal mobile telecommunications system (UMTS) ciphering key, GPRS UMTS integrity key, and GPRS ciphering key sequence number. Furthermore, if a mobile entity (ME) supports any GPRS encryption algorithm (GEA) that requires a 128-bit ciphering key and a USIM is in use, then the ME may contain a valid GPRS GSM ciphering key (e.g. $Kc_{128}$).

"U1 UPDATED" indicates that the last location updating attempt was successful (e.g. correct procedure outcome, and the answer was acceptance from the system). With this status, the SIM/USIM contains an LAI of an LA where a subscriber is registered, and possibly a valid TMSI, a GSM ciphering key, a UMTS integrity key, a UMTS ciphering key, and a ciphering key sequence number. Furthermore, if an ME supports any A5 ciphering algorithm that requires a 128-bit ciphering key and a USIM is in use, then the ME may contain a valid GSM ciphering key (e.g. $Kc_{128}$). A "Location update status" stored on an SIM/USIM may be "updated".

"EU1 UPDATED" indicates that the last attach or tracking area updating attempt was successful.

"GU2 NOT UPDATED" indicates that the last GPRS attach or routing area updating attempt failed procedurally, e.g. no response was received from a system. This includes the cases of failures or congestion inside the system. In this case, the SIM/USIM may contain an RAI of an RA to which a subscriber was attached, and possibly also a valid P-TMSI, a GPRS GSM ciphering key, a GPRS UMTS ciphering key, a GPRS UMTS integrity key, and a GPRS ciphering key sequence number. For compatibility reasons, all these fields may be set to a "deleted" value if the RAI is deleted. However, the presence of other values may not be considered an error by the mobile terminal 110. Furthermore, if an ME supports any GEA ciphering algorithm that requires a 128-bit ciphering key and a USIM is in use, then the ME may delete a GPRS GSM ciphering key (e.g. $Kc_{128}$) stored if the RAI is deleted.

"U2 NOT UPDATED" indicates that a last location updating attempt made failed procedurally (e.g. no significant answer was received from the system, including the cases of failures or congestion inside the system). For this status, the SIM/USIM may contain a valid LAI of a location area to which a subscriber was registered, and possibly also a valid TMSI, GSM ciphering key, a UMTS integrity key, a UMTS ciphering key, and a ciphering key sequence number. For compatibility reasons, all these fields may be set to a "deleted" value if an LAI is deleted. However the presence of other values may not be considered an error by the mobile station. Furthermore, if an ME supports any A5 ciphering algorithm that requires a 128-bit ciphering key and a USIM is in use, then the ME may delete a GSM ciphering key (e.g. $Kc_{128}$) stored if an LAI is deleted. A "Location update status" stored on an SIM/USIM may be "not updated".

"EU2 NOT UPDATED" indicates that a last attach, service request, or tracking area updating attempt failed procedurally, e.g. no response or reject message was received from a mobile management entity (MME).

In an embodiment of the present disclosure, an entered state may be "GMM-REGISTERED.ATTEMPTING-TO-UPDATE" if a change in a GPRS update status indicates "GU2 NOT UPDATED." A congestion timer may be a T3346 timer and a GPRS update status may be "GU1 UPDATED" and a change in a location area may correspond to a change in an RAI.

In an embodiment of the present disclosure, after a change in an RAI, if a T3346 timer is running and a GPRS update status is "GU1 UPDATED" then the mobile terminal 110 may set the GPRS update status to "GU2 NOT UPDATED" and enter state "GMM-REGISTERED.ATTEMPTING-TO-UPDATE."

In an embodiment of the present disclosure, while a T3346 timer is running and if there is a change in an RAI then the GMM may set an update status to "GU2 NOT UPDATED."

In an embodiment of the present disclosure, while a T3346 timer is running and if there is a change in an RAI then a GMM may move to a service state attempting to update.

In an embodiment of the present disclosure, if a congestion timer is a T3246 timer, an MM update status may be "U1 UPDATED," and a change in location area may correspond to a change in an LAI, then an entered state may be "MM IDLE, ATTEMPTING TO UPDATE" if a change in the MM update status indicates "U2 NOT UPDATED."

In an embodiment of the present disclosure, after a change in an LAI, if a T3246 timer is running and an MM update status is "U1 UPDATED," then an MS may set the MM update status to "U2 NOT UPDATED" and enter state "MM IDLE, ATTEMPTING TO UPDATE."

In an embodiment of the present disclosure, while a T3246 timer is running and if there is a change in an LAI, then an MM may move to a service state attempting to update.

In an embodiment of the present disclosure, while a T3246 timer is running and if there is a change in an LAI, then an MM may set an update status to "U2 NOT UPDATED."

In an embodiment of the present disclosure, if a timer is a T3346 timer, an EPS update status is "EU1 UPDATED," and a change in location area corresponds to a change in a TAI then an entered state is "EMM-REGISTERED.ATTEMPTING-TO-UPDATE" if a change in an EPS update status indicates "EU2 NOT UPDATED."

In an embodiment of the present disclosure, after a change in a TAI which is not part of a TAI list, if a T3346 timer is running and an EPS Mobility Management (EMM) update status is "EU1 UPDATED" then the mobile terminal 110 may set an EMM update status to "EU2 NOT UPDATED" and enter state "EMM-REGISTERED.ATTEMPTING-TO-UPDATE."

In an embodiment of the present disclosure, while a T3346 timer is running and if there is a change in a TAI which is not part of a stored TAI list, then an EMM may set an update status to "EU2 NOT UPDATED."

In an embodiment of the present disclosure, while a T3346 timer is running and if there is a change in a TAI that is not part of a stored TAI list then an EMM may move to a service state attempting to update.

In an embodiment of the present disclosure, the mobile terminal 110 may be configured to determine that a congestion timer is expired. The mobile terminal 110 may be further configured to initiate an update procedure to the network 120. The update procedure may correspond to one of an LAU procedure, an RAU procedure, and a TAU procedure.

For example, a UE "A" may be registered in an LAI-1 with a mobile switching center (MSC). However, a CM service request may be rejected with the cause value #22 (e.g., congestion). Further, the UE "A" may maintain a current state i.e., idle, normal service, and update status as "UPDATED." The UE "A" may start a T3246 timer. While the T3246 timer is running, the UE "A" cannot initiate any MM procedures. Further, the UE "A" may move from the LAI-1 area to an LAI-2 area, but since the T3246 timer is running, the UE "A" cannot initiate an MM procedure. However, the UE "A" may change its state to "MM IDLE, ATTEMPTING TO UPDATE" and set an update status to "NOT UPDATED." Upon expiration of the T3246 timer, the UE "A" may be in the LAI-2 area and state may indicate "MM IDLE, ATTEMPTING TO UPDATED" and an update status may be "NOT UPDATED," this may act as a trigger for the UE "A" to initiate an LAU procedure. If an MT call/short message service (SMS) is received from the network 120, the network 120 may page the UE "A" in the LAI-2 area and hence the UE "A" may not miss paging messages.

In an embodiment of the present disclosure, if the mobile terminal 110 is about to perform a public land mobile network (PLMN) selection for a ProSe (Proximity-based Service) direct communication as specified in the 3GPP TS 23.122 specification when the mobile terminal 110 is in a manual mode of operation then the mobile terminal 110 may indicate to a user that user intervention might be required before moving away from its preferred PLMN and performing a PLMN selection.

In an embodiment of the present disclosure, the mobile terminal 110 may not stop a T3346 timer (e.g. end CS domain congestion on the mobile terminal side) whenever the mobile terminal 110 receives a combined registration accept message (i.e., a combined RA/LA update accept or combined TA/LA update accept message) if the timer is started due to an extended wait time message received from lower layers during an MM procedure or a GMM procedure.

In an embodiment of the present disclosure, the mobile terminal 110 may support an Si mode and if a currently camped cell (i.e., the mobile terminal 110 is a part of a forbidden PLMN list for a GPRS service, then the mobile terminal 110 disables E-UTRA capability. The procedure to disable E-UTRA capability is defined in the TS 3GPP 24.008 and 24.301 specifications.

For example, if the mobile terminal 110 changes an LAI by moving to another LAI which is not the stored LAI (i.e. moves to an area in which the mobile terminal 110 is not registered), a non-access stratum (NAS) layer may get an indication from an access stratum (AS) layer about the same (e.g., a cell indication message). If a T3246 timer is running, then a NAS layer may not initiate any specific procedure (e.g., an LAU procedure). The mobile terminal 110 may store information that the registration area has changed. Storing information may be facilitated using a variable or by changing an update status to "U2 NOT UPDATED" (optionally a sub-state may also be changed to "Attempting to Update"). Based on the stored information, the mobile terminal 110 may initiate an LAU procedure upon expiration of a T3246 timer.

The mobile terminal 110 may not initiate an international mobile subscriber identity (IMSI) detach procedure, and the mobile terminal 110 may behave as defined in the 3GPP TS 24.008 specification in section 4.2.2.2.

For example, if the mobile terminal 110 is in a PS domain, a GMM may store similar information by moving to a sub-state "GMM_REGISTERED.ATTEMPTING TO UPDATE," whenever an RAI changes.

For example, the mobile terminal 110 may be in the EPS domain, an EMM may store similar information by moving to "EMM_REGISTERED.ATTEMPTING TO UPDATE," whenever a TAI is different than a stored TAI list.

If for any reason the mobile terminal 110 is not able to initiate a specific procedure after moving away from a registered area, then moved information may be stored by the mobile terminal 110 either using a variable or by changing a state to "ATTEMPTING TO UPDATE" and an update status to "NOT UPDATED."

FIG. 1 shows an overview of the system 100 but, the present disclosure is not limited thereto. Further, the system 100 may include any number of hardware or software components communicating with each other. For example, a component may be, but is not limited to, a process running in a controller or processor, an object, an executable process, a thread of execution, a program, or a computer. By way of illustration, both an application running on a device and the device may each be a component.

Figure 2:
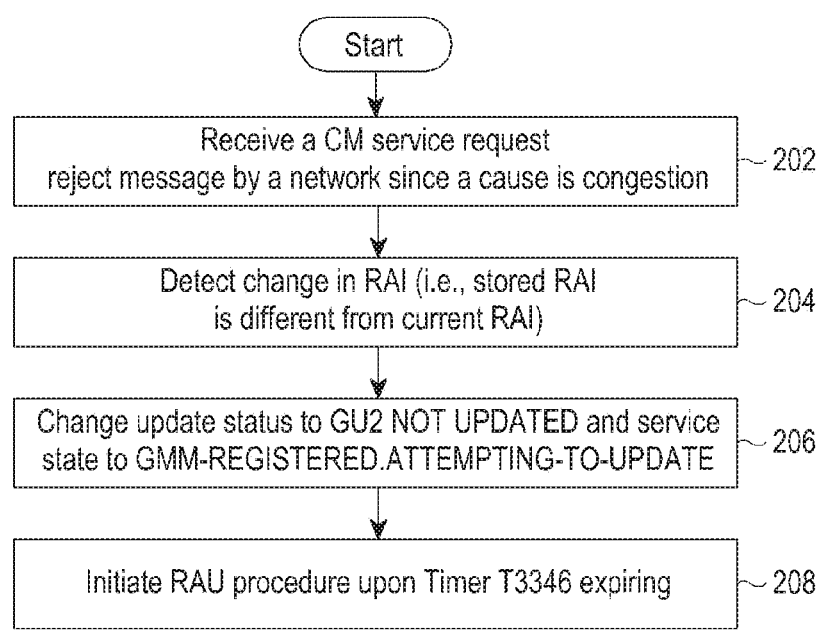
FIG. 2 is a flowchart of a method of avoiding missing paging by initiating an RAU procedure at a mobile terminal, according to an embodiment of the present disclosure.

FIG. 2 is a flowchart of a method of avoiding missing paging by initiating an RAU procedure at the mobile terminal 110, according to an embodiment of the present disclosure. Steps 202 to 208 may be performed by a processor (e.g., a microprocessor, a microcontroller, or the like).

Referring to FIG. 2, the initial GPRS update status of the mobile terminal 110 may be "GU1 UPDATED." At step 202, the method includes receiving a CM service request message from a network due to a cause of congestion (i.e., cause value #22). Based on the CM service request message from the network 120, the mobile terminal 110 may start a T3346 timer. At step 204, the method includes changing an RAI (which indicates that a stored RAI is different from a current RAI). At step 206, the method includes changing an update status to "GU2 NOT UPDATED" and a service state to "GMM-REGISTERED.ATTEMPTING-TO-UPDATE." At step 208, the method includes initiating an RAU procedure upon expiration of a T3346 timer.

The various actions, acts, blocks, steps, and the like in the method of FIG. 2 may be performed in the order presented, in a different order, or simultaneously. Further, in some embodiments of the present disclosure, some actions, acts, blocks, steps, and the like may be omitted, added, modified, skipped, and the like without departing from the scope or spirit of the present disclosure.

Figure 3:
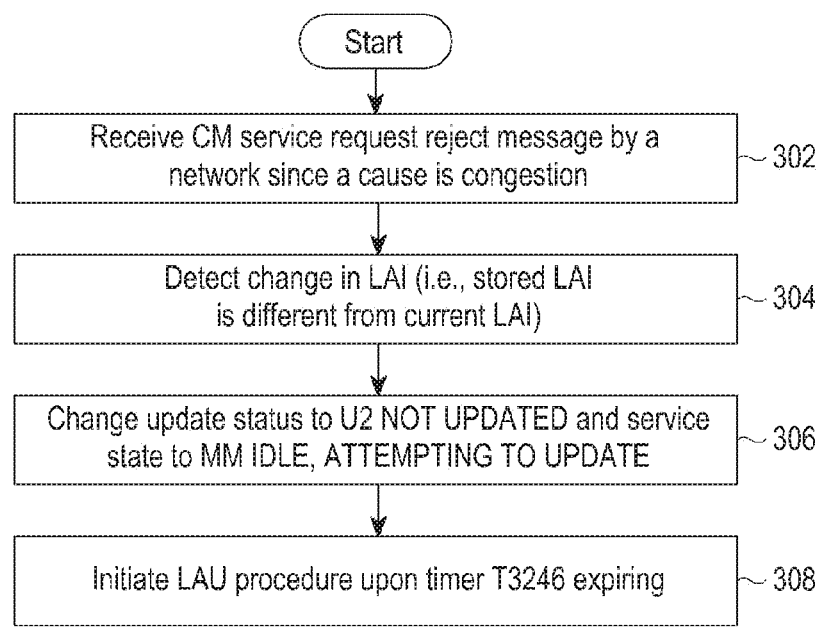
FIG. 3 is a flowchart of a method of avoiding missing paging by initiating an LAU procedure at a mobile terminal, according to an embodiment of the present disclosure.

FIG. 3 is a flowchart of a method of avoiding missing paging by initiating an LAU procedure at the mobile terminal 110, according to an embodiment of the present disclosure. Steps 302 to 308 may be performed by a processor (e.g., a microprocessor, a microcontroller, or the like). Referring to FIG. 3, an MM update status of the mobile terminal 110 is initially "U1 UPDATED." At step 302, the method includes receiving a CM service request reject message by a network due to a cause of congestion. Based on receiving the CM service request reject message, the mobile terminal 110 starts a T3246 timer. At step 304, the method includes changing an LAI (i.e., a stored LAI may be different from the current LAI). At step 306, the method includes changing an update status to "U2 NOT UPDATED" and a service state to "MM IDLE, ATTEMPTING TO UPDATE." At step 308, the method includes initiating an LAU procedure after the T3246 timer expires.

The various actions, acts, blocks, steps, and the like in the method of FIG. 3 may be performed in the order presented, in a different order or simultaneously. Further, in some embodiments of the present disclosure, some actions, acts, blocks, steps, and the like may be omitted, added, modified, skipped, and the like without departing from the scope and spirit of the present disclosure.

Figure 4:
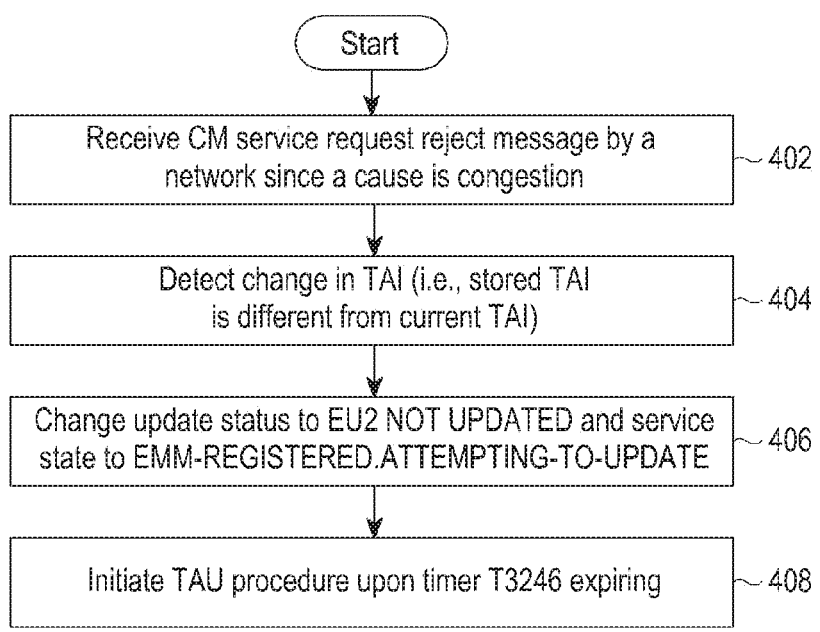
FIG. 4 is a flowchart of a method of avoid missing paging by initiating a TAU procedure at a mobile terminal, according to an embodiment of the present disclosure.

FIG. 4 is a flowchart of a method of avoiding missing paging by initiating a TAU procedure at the mobile terminal 110, according to an embodiment of the present disclosure. Steps 402 to 408 may be performed by a processor (e.g., a microprocessor, a microcontroller, or the like).

Referring to FIG. 4, an EPS update status of the mobile terminal 110 may initially be "EU1 UPDATED." At step 402, the method includes receiving a CM service request reject message by a network due to a cause of congestion. Upon receiving the CM service request reject message from the network, the mobile terminal 110 starts a T3346 timer. At step 404, the method includes changing a TAI (i.e., a stored TAI may be different from a current TAI). At step 406, the method includes changing an update status to "EU2 NOT UPDATED" and a service state to "EMM-REGISTERED.ATTEMPTING-TO-UPDATE." At step 408, the method includes initiating a TAU procedure upon expiration of the T3246 timer.

The various actions, acts, blocks, steps, and the like in the method of FIG. 4 may be performed in the order presented, in a different order or simultaneously. Further, in some embodiments of the present disclosure, some actions, acts, blocks, steps, and the like may be omitted, added, modified, skipped, and the like without departing from the scope and spirit of the present disclosure.

Figure 5:
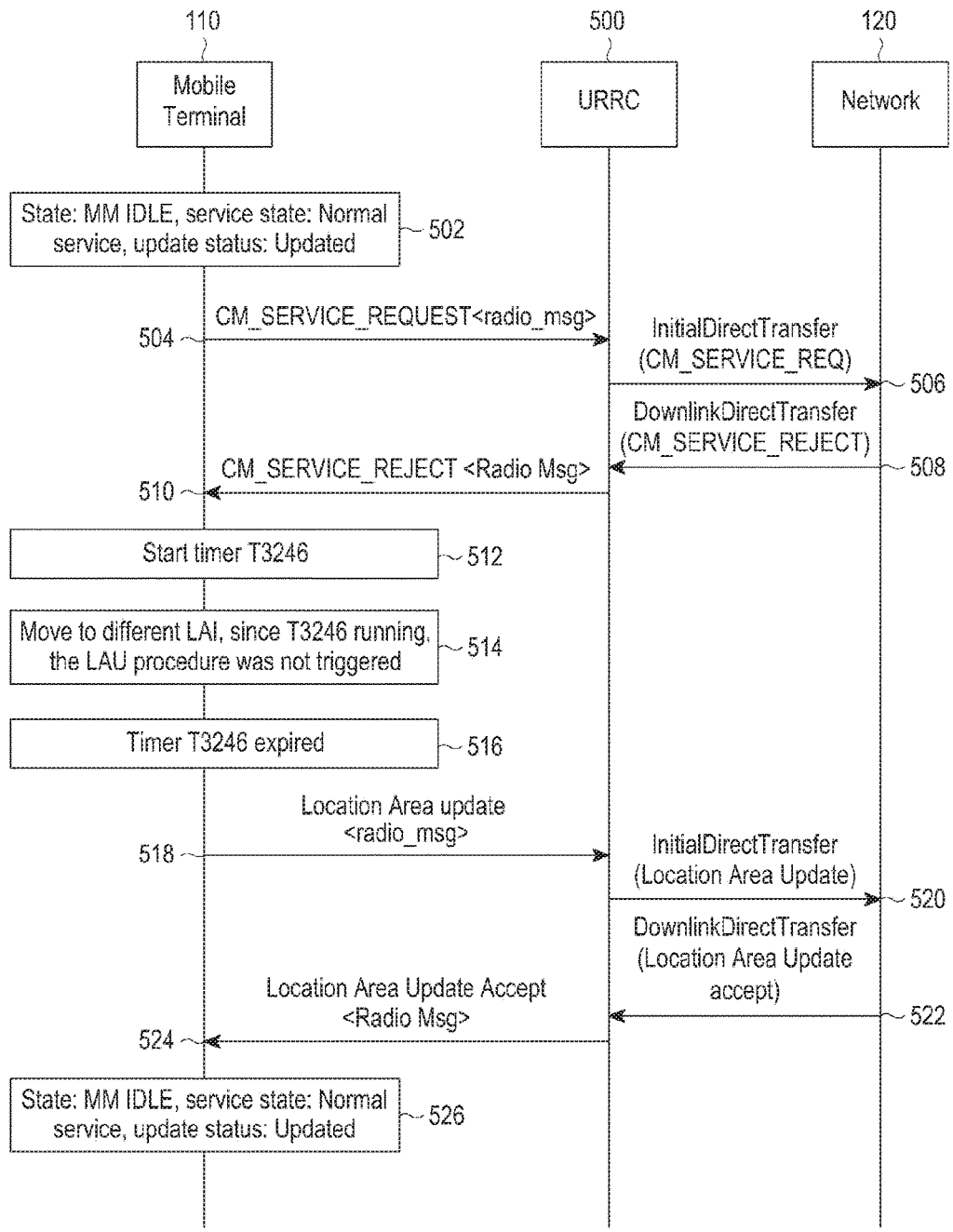
FIG. 5 is a sequence diagram of updating an "MM IDLE, ATTEMPTING TO UPDATE" state in a circuit switched (CS) service, according to an embodiment of the present disclosure.

FIG. 5 is a sequence diagram of updating an "MM IDLE, ATTEMPTING TO UPDATE" state in a CS service, according to an embodiment of the present disclosure.

Referring to FIG. 5, at step 502, the mobile terminal 110 may be in the following state: "State: MM IDLE, service state: Normal service, update status: Updated". At step 504, the mobile terminal 110 sends a "CM_SERVICE_REQUEST" message to a UMTS radio resource control (URRC) 500. At step 506, the URRC 500 sends an initial direct transfer message encapsulating "CM_SERVICE_REQUEST" information to the network 120. Upon receiving the initial direct transfer message, at step 508, the network 120 sends a downlink direct transfer message encapsulating "CM_SERVICE_REJECT" information to the URRC 500. At step 510, the URRC 500 sends the "CM_SERVICE_REJECT" message to the mobile terminal 110.

After the mobile terminal 110 receives the "CM_SERVICE_REJECT" message, at step 512, the mobile terminal 110 starts a T3246 timer. At step 514, the mobile terminal 110 may move to a different LAI, since the T3246 timer is running, an LAU procedure may not be triggered. At step 516, the T3246 timer may expire. At step 518, the mobile terminal 110 sends a location area update message to the URRC 500. At step 520, the URRC 500 sends the initial direct transfer message encapsulating location area update information to the network 120. At step 522, the network 120 sends the downlink direct transfer message encapsulating location area update accept information to the URRC 500. At step 524, the URRC 500 sends the location area update accept information to the mobile terminal 110. At step 526, after mobile terminal 110 receives the location area update accept information, the mobile terminal 110 may be in the following state: "MM IDLE, service state: Normal service, update status: Updated."

Figure 6:
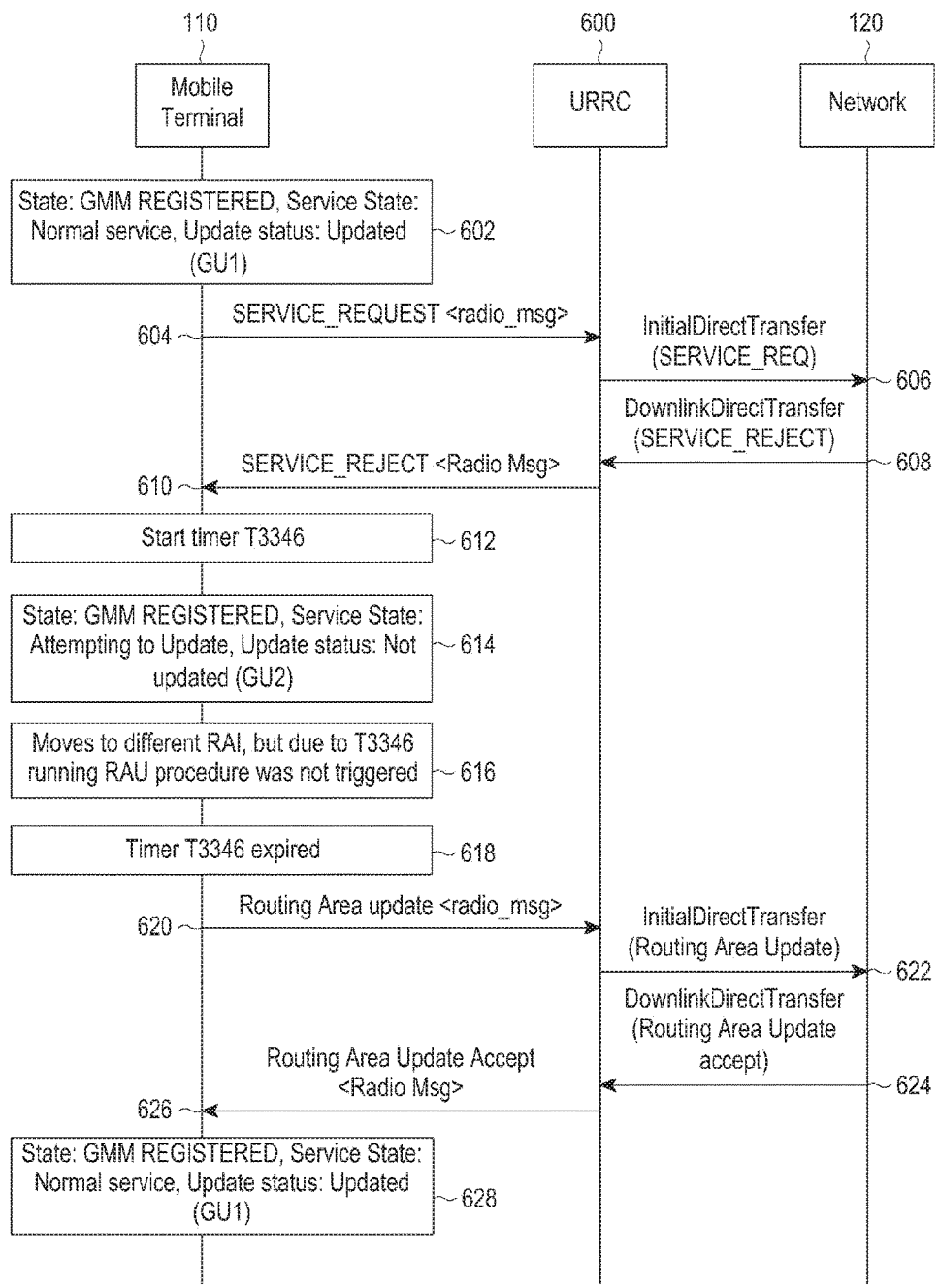
FIG. 6 is a sequence diagram of updating a "GMM-REGISTERED.ATTEMPTING-TO-UPDATE" state in a packet switched (PS) service, according to an embodiment of the present disclosure.

FIG. 6 is a sequence diagram of updating a "GMM-REGISTERED.ATTEMPTING-TO-UPDATE" state in a PS service, according to an embodiment of the present disclosure.

Referring to FIG. 6, at step 602, the mobile terminal 110 may be in the following state: "State: GMM REGISTERED, Service State: Normal service, Update status: Updated (GU1)". At step 604, the mobile terminal 110 sends a "SERVICE_REQUEST" message to the URRC 600. The URRC 600 sends an initial direct transfer message encapsulating the "SERVICE_REQUEST" information to the network 120. The network 120 sends a downlink direct transfer message encapsulating the "SERVICE_REJECT" information to the URRC 600. At step 610, the URRC 600 sends the "SERVICE_REJECT" message to the mobile terminal 110. At step 612, the mobile terminal 110 starts a T3346 timer. At step 614, the mobile terminal 110 may be in the following state: "State: GMM REGISTERED, Service State: Attempting to Update, Update status: Not updated (GU2)."

At step 616, the mobile terminal 110 moves to a different RAI, since the T3346 timer is running, an RAU procedure may not be triggered. At step 618, the T3346 timer expires. After the T3346 timer expires, at step 620, the mobile terminal 110 sends RAU information to the URRC 600. At step 622, the URRC 600 sends an initial direct transfer message encapsulating the RAU information to the network 120. At step 624, the network 120 sends a downlink direct transfer message encapsulating routing area update accept information to the URRC 600. At step 626, the URRC 600 sends RAU accept information to the mobile terminal 110. At step 628, the mobile terminal 110 may be in the following state: "State: GMM REGISTERED, Service State: Normal service, Update status: Updated (GU1)."

The embodiments of the present disclosure described above may be implemented through at least one software program running on at least one hardware device and performing network management functions to control elements. The elements shown in FIGS. 1, 5, and 6 include blocks which may be at least one of a hardware device or a combination of a hardware device and a software module.

The foregoing description of the certain embodiments of the present disclosure so fully reveals the general nature of the embodiments herein that others may, by applying current knowledge, readily modify and/or adapt for various applications such embodiments without departing from the present disclosure, and, therefore, such adaptations and modifications are intended to be within the scope of the present disclosure. It is to be understood that the terminology employed herein is for the purpose of description and not of limitation. Therefore, while the embodiments herein have been described in terms of preferred embodiments, those skilled in the art will recognize that the embodiments herein may be practiced with modification within the scope of the present disclosure as defined by the appended claims and their equivalents.

What is claimed is:

1. A method to manage paging at a terminal in a wireless communication system, the method comprising:
    transmitting a connection management (CM) service request message to a network comprising at least one cell;
    receiving, from the network, a CM service reject message in response to the CM service request message;
    starting a congestion timer;
    detecting a location area change while the congestion timer is running and an update status of update statuses is set as a first value indicating that a procedure of update procedures for the paging was successful;
    when the location area change is detected, changing the update status to a second value indicating that the procedure failed; and
    when the congestion timer is expired, performing to initiate the procedure,
    wherein the update procedures include last attach, area updating attempt, and location updating attempt.

2. The method of claim 1, wherein:
    the update statuses include a general packet radio service (GPRS) update status, a mobility management (MM) update status, and an evolved packet system (EPS) update status.

3. The method of claim 2, wherein, when the update status is the MM update status, the first value of the MM update status indicates the location updating attempt was successful, wherein the location updating attempt is a last location updating attempt.

4. The method of claim 2, wherein, when the update status is the EPS update status, the first value of the EPS update status indicates the last attach or the updating attempt was successful, wherein the updating attempt is a tracking area updating attempt, and
    when the update status is the GPRS update status, the first value of the GPRS update status indicates the last attach or area updating attempt was successful, and
    wherein the last attach is a last GPRS update status attach, and the area updating attempt is a routing area updating (RAU) attempt.

5. The method of claim 2, wherein, when the update status is the EPS update status, the second value of the EPS update status indicates the last attach, a service request, or the area updating attempt failed, wherein the area updating attempt is a tracking area updating attempt.

6. The method of claim 2, wherein, when the update status is the GPRS update status, the second value of the GPRS update status indicates the last attach or the area updating attempt failed, wherein the last attach is a last GPRS update status attach, and the area updating attempt is a routing area updating attempt.

7. The method of claim 2, wherein, when the update status is the MM update status, the second value of the MM update status indicates the location updating attempt failed, wherein the location updating attempt is a last location updating attempt.

8. The method of claim 1, further comprising:
    after performing to initiate the procedure, transitioning one of a GPRS mobility management (GMM)-REGISTERED.ATTEMPTING-TO-UPDATE state indicating that a routing area updating procedure failed due to a missing response from the network, and an MM IDLE, ATTEMPTING TO UPDATE state indicating that value subscriber data is available.

9. The method of claim 1, wherein performing to initiate the procedure comprises:
    transmitting an initial direct transfer message comprising location area update procedure information corresponding to the procedure to the network through a universal mobile telecommunications system (UMTS) radio resource control (URRC) unit; and
    receiving a downlink direct transfer message comprising location area update accept information in response to the initial direct transfer message from the network through the URRC unit.

10. The method of claim 9, further comprising:
    identifying location area update accept information from the downlink direct transfer message; and
    transitioning to an MM IDLE, ATTEMPTING TO UPDATE state indicating that valid subscriber data is available.

11. A terminal to manage paging in a wireless communication system, the terminal comprising:
    a transceiver configured to transmit a connection management (CM) service request message to a network comprising at least one cell, and receive, from the network, a CM service reject message in response to the CM service request message; and
    a controller configured to start a congestion timer, detect a location area change while the congestion timer is running and an update status of update statuses is set as a first value indicating that a procedure of update procedures for the paging was successful, when the location area change is detected, change the update status to a second value indicating that the procedure failed, and when the congestion timer is expired performing to initiate an update procedure,
    wherein the update procedures include last attach, area updating attempt, and location updating attempt.

12. The terminal of claim 11, wherein:
    the update statuses include a general packet radio service (GPRS) update status, a mobility management (MM) update status, and an evolved packet system (EPS) update status.

13. The terminal of claim 12, wherein, when the update status is the MM update status, the first value of the MME update status indicates the location updating attempt was successful, wherein the location updating attempt is a last location updating attempt.

14. The terminal of claim 12, wherein, when the update status is the EPS update status, the first value of the EPS update status indicates the last attach or the updating attempt was successful, wherein the updating attempt is a tracking area updating attempt, and
    when the update status is the GPRS update status, the first value of the GPRS update status indicates the last attach or area updating attempt was successful, and wherein the last attach is a last GPRS update status attach, and the area updating attempt is a routing area updating (RAU) attempt.

15. The terminal of claim 11, further comprising:
after performing to initiate the procedure, the controller is configured to transmit one of a GPRS mobility management (GMM)-REGISTERED.ATTEMPTING-TO-UPDATE state indicating that a routing area updating procedure failed due to a missing response from the network, and a MM IDLE, ATTEMPTING TO UPDATE state indicating that valid subscriber data is available.

16. The terminal of claim 11, wherein, when the update status is the GPRS update status, the second value of the GPRS update status indicates GU2 is not updated, and the procedure is a last GPRS update status attach procedure or a RAU procedure.

17. The terminal of claim 11, wherein, when the update status is the MM update status, the second value of the MM update status indicates U2 is not updated, and the procedure is a last location updating attempt.

18. The terminal of claim 11, wherein, when the update status is the EPS update status, the second value of the EPS update status indicates EU2 is not updated, and the procedure is a last attach, a service request, or a tracking area updating attempt.

19. The terminal of claim 11, wherein the performing to initiate the procedure comprises the controller is configured to control the transceiver to transmit an initial direct transfer message comprising location area update procedure information corresponding to the procedure to the network through a universal mobile telecommunications system (UMTS) radio resource control (URRC) unit, and receive a downlink direct transfer message comprising location area update accept information in response to the initial direct transfer message from the network through the URRC unit.

20. The terminal of claim 19, wherein the controller is configured to identify location area update accept information from the downlink direct transfer message, and transit to a MM IDLE, ATTEMPTING TO UPDATE state indicating that valid subscriber data is available.

* * * * *